United States Patent [19]

Testa

[11] Patent Number: 4,707,093

[45] Date of Patent: Nov. 17, 1987

[54] METHOD AND DEVICE FOR ILLUMINATING THE FACE PLATE OF A COLOR TELEVISION TUBE FOR FORMATION OF THE SCREEN

[75] Inventor: Pierluigi Testa, Rome, Italy

[73] Assignee: Videocolor, Montrouge, France

[21] Appl. No.: 867,990

[22] Filed: May 29, 1986

[30] Foreign Application Priority Data

Jun. 4, 1985 [FR] France ................................ 85 08396

[51] Int. Cl.[4] ................................ G03B 41/00

[52] U.S. Cl. ................................ 354/1

[58] Field of Search ................................ 354/1; 250/354.1

[56] References Cited

U.S. PATENT DOCUMENTS

| | | | |
|---|---|---|---|
| 3,575,627 | 4/1971 | Nicoll | 313/92 |
| 3,637,410 | 1/1972 | Stevens | 117/8 |
| 3,783,754 | 1/1974 | Takemoto et al. | 354/1 X |
| 3,949,226 | 4/1976 | Dugan et al. | 250/354 |
| 3,983,613 | 10/1976 | Palac et al. | 29/25.19 |
| 4,053,905 | 10/1977 | Schlafer | 354/1 |
| 4,053,906 | 10/1977 | Schultz | 354/1 |
| 4,433,384 | 2/1984 | Berrian et al. | 364/525 |

FOREIGN PATENT DOCUMENTS

| | | |
|---|---|---|
| 3035367 | 5/1982 | Fed. Rep. of Germany . |
| 3200496 | 7/1983 | Fed. Rep. of Germany . |
| 2091717 | 1/1972 | France . |
| 2095645 | 2/1972 | France . |
| 2236395 | 1/1975 | France . |
| 57-196450 | 12/1982 | Japan . |
| 58-201227 | 11/1983 | Japan . |

*Primary Examiner*—Donald A. Griffin
*Attorney, Agent, or Firm*—Pollock, VandeSande & Priddy

[57] ABSTRACT

Device for illuminating photosensitive light hardenable material for the manufacture of a perforated mask type color cathode ray tube, wherein this device comprises a laser, a light modulator and a deflector to deflect the modulated pencil of light, the light modulator and the deflector being controlled by a computer so that the luminous intensity received by each point of the screen is substantially constant.

13 Claims, 1 Drawing Figure

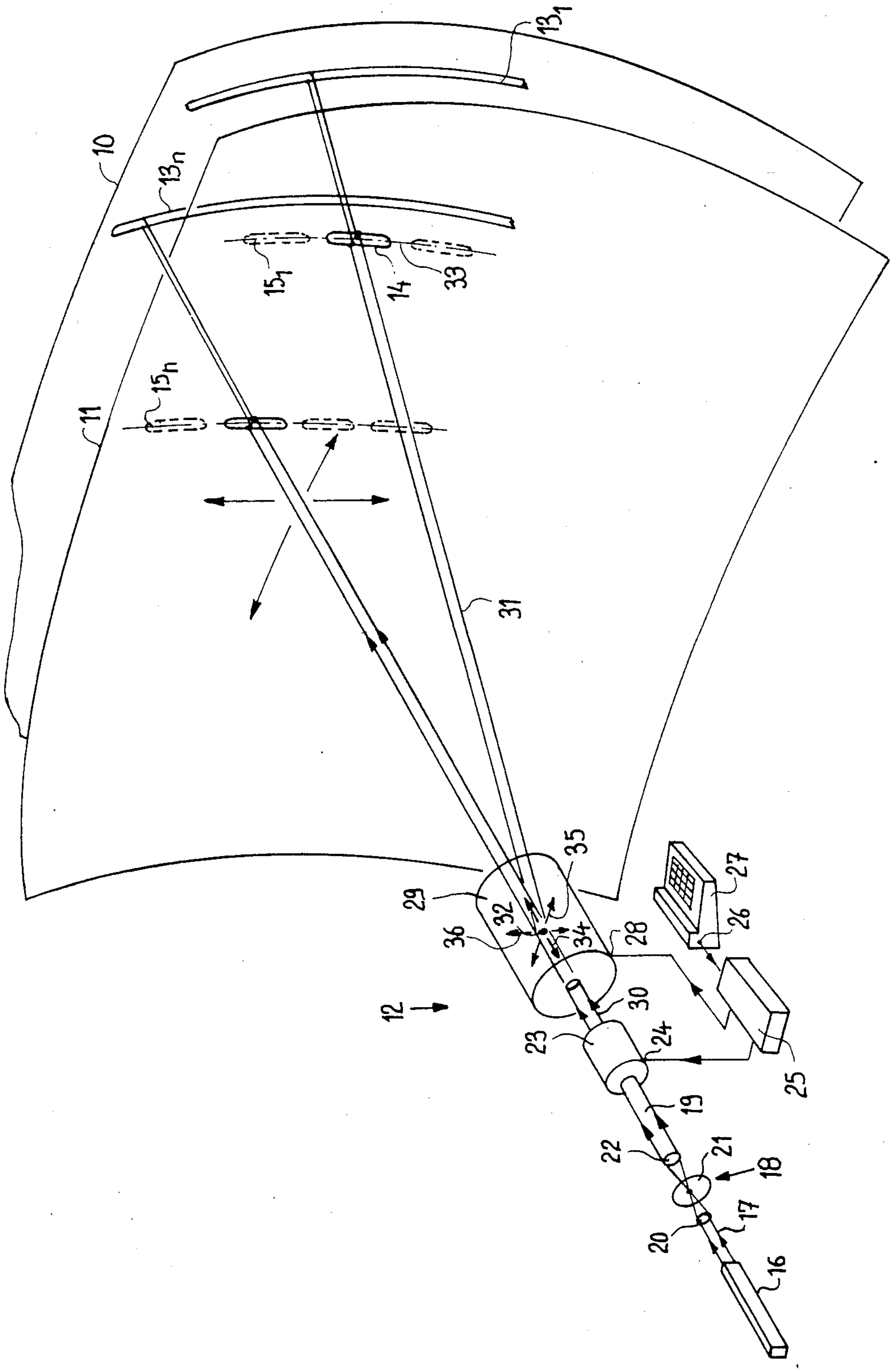
10
11
12
$13_1$
$13_n$
14
$15_1$
$15_n$
16
17
18
19
20
21
22
23
24
25
26
27
28
29
30
31
32
33
34
35
36

METHOD AND DEVICE FOR ILLUMINATING THE FACE PLATE OF A COLOR TELEVISION TUBE FOR FORMATION OF THE SCREEN

BACKGROUND OF THE INVENTION

1. Field of the invention

The present invention concerns a method and a device for illuminating a photosensitive material disposed upon a face plate for the formation of a cathodoluminescent screen of a perforated mask type color television tube.

2. Description of the prior art

A color television tube comprises a frontal face plate upon the internal surface of which is deposited the screen which is normally formed of vertical bands of cathodoluminescent material emitting, when it is bombarded by an electron beam produced by an electron gun, a red, green or blue color light. The screen thus comprises a succession of vertical three-band assemblies, each assembly presenting a red band, a green band and a blue band. Each color is excited by a corresponding electron beam. In a tube, often known as "matrix", two bands of adjacent phosphors are separated by a black band of graphite, which produces an image of improved contrast. In a mask tube, for selecting the colors, i.e. so that the beam intended for one color, for example blue, only strikes the phosphor of that color (blue), a perforated mask is provided in front of the screen, the position and the disposition of the slots of this mask ensuring the said selection.

Since the position of the mask with respect to the screen deposited on the face plate must be determined accurately, the mask is secured to the face plate of the tube prior to the formation of the screen in order that this mask can be utilized to produce the screen. Each of the luminescent substances is deposited in the following way: the internal face of the face plate is coated with a solution of this substance in a photosensitive material which hardens when it is illuminated by an ultra-violet radiation (UV), then through the mask this solution coating the internal face of the face plate is illuminated by an optical system that comprises an UV radiation source and an objective simulating the tube deflector. The position of the optical system, especially of the UV lamp, depends upon the color of the phosphor in solution. In this way, only the photosensitive material situated at the sites provided for the determined color is illuminated and can thus harden. The material situated at the other sites does not harden and does not adhere to the glass; it can be cleaned by washing with water or by means of any other liquid.

The UV source emitting a radiation the intensity of which is not constant in function of the emitting direction, between this source and the screen is disposed a filter which compensates this lack of uniformity so that the intensity of radiation reaching the screen is substantially constant on the surface of this latter; indeed, if it were not so, the surface area of the hardened sites would not be constant.

The mask is formed of slots disposed successively along vertical lines while it is desired to form continuous vertical lines upon the screen. If no particular measures are taken, discontinuous lines of phosphors and graphite will thus be obtained on the screen. In order to prevent this defect, during illumination, the illumination device is moved in a vertical direction.

For the manufacture of each type and of each dimension of color television tube, it is necessary to provide a particular illumination device. In other words, a device or apparatus designed for one determined type and one size cannot be used for another size or another type. Furthermore, the exposure times are relatively long.

The present invention overcomes these drawbacks.

The device according to the invention comprises: a luminous source emitting a pencil of light or fine luminous beam, preferably a laser, a deflector to deflect the beam so that it scans the surface of the face plate, a light modulator and a programmable apparatus, such as a computer, to control, on the one hand, the light modulator so that the luminous intensity received by the screen is practically constant, and on the other hand, the scanning to light up the vertical bands on the screen through the perforated holes of the mask.

The light modulator acts in a similar way to the filter of the illuminating device of the prior art, i.e. it is controlled so that in each point or dot of the screen, the quantity of luminous energy received per surface unit is constant. It is, however, to be noted that in theory the pencil of light has a constant luminosity whatever the direction whereas this is not the same with the known apparatus; but the compensation to be performed results from the fact that the intersection of the pencil of light by the screen is not the same from one point to another of this screen; this section is greater on the edges than at the center and thus, the energy density received per surface unit is lower on the edges than at the center, i.e. the light modulator is controlled so that the intensity is lower at the center than on the edges.

When the luminous source is constituted by a laser, the exposure time is small, thereby reducing the manufacturing duration.

In one embodiment, the programmable apparatus also controls the displacement of the center of deflection. This displacement, when it is performed parallel to the lines of the screen, allows to pass from the illumination of one band of determined color to a band of another color. A displacement of this center parallel to the vertical bands of the screen ensures the continuity of the bands of phosphors and possibly the black bands. Furthermore, a displacement of the center of deflection perpendicularly to the screen allows to adapt the illumination device to the manufacture of other types and dimensions of tubes.

BRIEF DESCRIPTION OF THE DRAWING

Other features, objects and advantages of the invention will become more clearly apparent from the following description of certain embodiments, given with reference to the single appended drawing which is a schematic diagram representing the device according to the invention, as well as the screen face plate and the mask of a color visualization tube, especially a television receiver tube.

DESCRIPTION OF THE PREFERRED EMBODIMENT

On this figure, the screen face plate 10 and the mask 11 have been represented on a larger scale than the illuminating device 12. This device 12 is used to illuminate, along vertical bands $13_1$, $13_2$ . . . $13_n$, the internal face of face plate 10 which is coated over its entire surface area by a phosphor solution of determined color- or of graphite- in a photosensitive material. This illumination hardens the photosensitive material on these bands; in this way, the hardened material remains, with the phosphor or the graphite that it contains, on the glass while the non hardened material, i.e. which has not been illuminated, can be eliminated through washing.

The illumination is performed through perforated holes 14 of mask 11 that are constituted by vertically elongated slots disposed along columns having a vertical axis $15_1 \ldots 15_n$. During normal operating of the color visualization tube, the perforated mask 11 acts to conceal each of the electron beams so that the beam intended to excite the phosphors of one color does not excite the phosphors of another color. This is the reason why this mask 11 has a position which is very precisely determined with respect to the screen 10 and, due to this fact, the screen is formed from the holes of the mask.

Illuminating device 12 according to the invention, comprises, in the present example, a luminous source constituted here by a laser 16 emitting an ultra-violet radiation adapted to harden the photosensitive materials disposed on the screen 10. The beam 17 of coherent light which issues from the laser 16 presents an intensity which is not necessarily constant at all the points of its section, a mounting 18 is provided allowing to diaphragm this beam 17 in order to produce a beam 19 of more uniform intensity on its section. With this purpose, the mounting 18 comprises a focussing lens 20, a diaphragm 21 the opening of which is situated at the focus of the lens 20, and a lens 22 of which the object focus is situated at the site of opening of the diaphragm 21. The mounting 18 therefore only retains the central part of the laser beam and it increases the section of this central part.

The beam 19 penetrates a light modulator 23 controlled by an electric signal, applied to a corresponding input 24, that is supplied by an interface 25 between the input 24 of the modulator 23 and the output 26 of a computer 27. The interface 25 comprises a shunting circuit with two tracks and for each track a digital-analog converter and an amplifier for the output signals of the converter.

The interface 25 comprises a second output that delivers a signal to control input 28 of a deflector 29 for the pencil of light 30 issuing from the light modulator 23.

The deflector 29 deflects the beam 30 through refraction and/or reflection so as to produce an output beam 31 that scans the entire surface of the screen 10. The displacement is, for example, performed column by column, i.e. the beam 31 is displaced first of all in a vertical first plane, that of the band $13_1$; thereafter, it is displaced to scan column $13_2$, etc.

If in the deflector 29 the center of deviation 32 remains unchanged, non illuminated segments corresponding to the intervals 33 between the slots 14 of the mask 11 will be obtained. This is the reason why the center of deviation 32 is vertically displaced, parallely to these columns, towards the top or towards the bottom sufficiently to reach the parts of the columns 13 that have not been lit up during the first scanning operation. This vertical displacement of the center of deviation 32 is performed column by column, i.e. after each scanning operation of a column the center 32 is displaced (arrows 36) and a fresh scanning of that column is performed with this new position of center 32. In an embodiment of the invention, all the columns of the screen 10 are scanned with the center 32 unchanged, then the center is displaced in order to perform a fresh scanning of the whole of the columns so as to reach the segments of these columns non illuminated during the first scanning operation.

The center of deflection 32 of the deflector 29 can also be displaced in the horizontal direction perpendicularly to the beam 30, according to the direction of the arrows 35, parallel to the lines of the screen, in order to pass from the illumination of the sites of one color to the illumination of the sites of another color or of black bands.

Furthermore, the center of deviation 32 can be displaced perpendicularly to the screen, i.e. in the direction (arrows 34) of the beams 17, 19 and 30, especially in order to allow adaptation of the device 12 to another type of tube to be manufactured.

The light modulator 23 is constituted by a Kerr effect cell, by a Pockels effect cell or by a Faraday effect cell. For further specification of this type of electro-optical or magneto-optical modulator, reference may be made to the work "Opto-électronique" by G. Broussaud, Masson et Cie, 1974.

Deflector 29 is for example a Brillouin effect acousto-optical deflector or a mechanical deflector or an electo-optical deflector, for example a Pockels effect deflector. Further specification as to these deflectors may also be found in the above-mentioned work.

For the deflector 29 it is possible to combine electro-acoustic means, in order to perform scanning with the center of deviation 32 unchanged, with mechanical type means that displace this deflector so as to displace the center of deviation 32. It is also possible to utilize rotating mirror means integral with a support rotating according to another axis such as described in German patent application No. 3,034,367.

Computer 27 is programmed so as to deliver in succession on its output 26 control signals appropriate to each instant for the modulator 23 and for the deflector 29. Thus, at each instant the output 26 of the computer delivers a signal applied to the input 24 of the modulator 23 that represents an attenuation amplitude of the beam 19 and of signals, transmitted of the input 28, that represent the position of the center of deviation 32, the position of the scanning plane in which must be situated the pencil of light 31 and the angle that forms this pencil of light 31 with a reference direction in this plane.

In order to utilize device 12 with a view to manufacturing another type of tube, especially of another size, it is sufficient to modify the program of computer 27. Such a program and its modification constitute current operations for those skilled in the art.

Although it is preferable that the luminous source be constituted by a laser beam, it will be noted that said source can also be constituted by a source of incoherent light.

In another variant of the invention, instead of using modulator 23, laser 16 can be modulated by computer 27.

I claim:

1. A device for illuminating photosensitive light hardenable material for manufacturing the screen of a perforated mask type color cathode ray tube comprising; a luminous source emitting a pencil of light and a deflector for deviating this pencil of light so that it scans the screen in front of which is disposed the perforated mask which further includes a light modulator subjected to a pencil of light from said luminous source and controlled by a computer in order that the luminous intensity received by each point of the screen be substantially constant.

2. A device according to claim 1, wherein the light modulator is disposed between the luminous source and the deflector.

3. A device according to claim 1, wherein the light modulator is of the electro-optical or magneto-optical type.

4. A device according to claim 1, wherein the computer also controls the deflector.

5. A device according to claim 4, wherein the center of deviation in the deflector is displaceable, upon control by the computer, parallel to the lines of the screen in order to pass from the illumination of the sites of phosphor of one color to the illumination of the sites of phosphor of another color or black bands between the phosphors.

6. A device according to claim 5, wherein the center of deviation is vertically displaceable, in a direction parallel to the columns of phosphors on the screen in order to allow illumination of each point of such a column despite the intervals between the adjacent slots of the mask.

7. A device according to claim 6, wherein the control by the computer is performed so that the center of deviation remains unchanged when the pencil of light scans a column over the entire height of the screen, then this center of deviation is displaced according to the said vertical direction parallel to one column so that the points of this column which have been concealed by the intervals between the slots of the mask are illuminated during this second scanning of the same column.

8. A device according to claim 6, wherein the computer controls the displacement of the center of deflection so that this latter remains unchanged during the scanning of the various columns of the screen and, thereafter, is displaced so as to perform a second scanning of the whole of the columns, the displacement being performed so that the sites of the columns which, during the first scanning, have been concealed are illuminated during this second scanning.

9. A device according to claim 4, wherein the center of deflection of the deflector is displaceable, upon control of the computer, according to the direction perpendicular to the screen in order to allow utilization of this device for the manufacture of the screen of various types of tubes.

10. A device according to claim 1, wherein the deflector is of the electro-acoustic type.

11. A device according to claim 10, wherein the luminous source comprises a laser emitting an ultra-violet radiation.

12. A device according to claim 11, which further includes a diaphragm so that only the central pencil of light of the laser beam is deflected by the deflector.

13. A device according to claim 12, wherein the control of the light modulator by the computer is such that it compensates for variation of the intersection of the pencil of light by the screen from one point to another of this screen.

* * * * *